United States Patent [19]
Yamada et al.

[11] Patent Number: 5,404,168
[45] Date of Patent: Apr. 4, 1995

[54] METHOD AND APPARATUS FOR ENCODING AN IMAGE SIGNAL USING A MULTI-STAGE QUANTIZING NUMBER DETERMINER

[75] Inventors: Takaaki Yamada, Kanagawa; Naofumi Yanagihara, Tokyo; Hiroshi Okada, Kanagawa, all of Japan

[73] Assignee: Sony Corporation, Tokyo, Japan

[21] Appl. No.: 19,872

[22] Filed: Feb. 19, 1993

[30] Foreign Application Priority Data

Feb. 25, 1992 [JP] Japan .................................. 4-073475

[51] Int. Cl.⁶ .......................................... H04N 7/133
[52] U.S. Cl. .................................... 348/405; 348/27
[58] Field of Search ............... 348/403, 404, 405, 27; H04N 7/133

[56] References Cited

U.S. PATENT DOCUMENTS 5,144,424  9/1992  Savatier ........................ 348/405
5,157,488 10/1992  Pennebaker .................... 348/405
5,231,484  7/1993  Gonzales et al. ............... 348/405

FOREIGN PATENT DOCUMENTS 0401854 12/1990 European Pat. Off. .
0469835  2/1992 European Pat. Off. .
0470773  2/1992 European Pat. Off. .
0481768  4/1992 European Pat. Off. .
0517256 12/1992 European Pat. Off. .
3940554  6/1990 Germany .

Primary Examiner—Tommy P. Chin
Assistant Examiner—Richard Lee
Attorney, Agent, or Firm—William S. Frommer; Alvin Sinderbrand

[57] ABSTRACT

A quantizing number is determined using multiple stages of code amount estimating circuits. Thus, an optimum quantizing number may be selected from among a number of quantizing numbers which is not limited to the number of code amount estimating circuits. The optimum quantizing number is used to quantize a set of blocks of orthogonally transformed image data. The quantized data are encoded using a variable length code. The optimum quantizing number is the one which results in the greatest amount of data that is within a predetermined threshold, permitting an amount of encoded data to be recorded on a magnetic tape in a fixed format.

20 Claims, 12 Drawing Sheets

Fig. 8

| Q NUMBER | AREA NUMBER ||||||||||||||||
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $Q_0$ | 2 | 2 | 2 | 4 | 4 | 4 | 6 | 6 | 8 | 8 | 8 | 10 | 16 | 16 | 16 | 16 |
| $Q_1$ | 2 | 2 | 2 | 4 | 6 | 6 | 6 | 6 | 8 | 8 | 8 | 10 | 16 | 16 | 16 | 32 |
| $Q_2$ | 4 | 4 | 4 | 4 | 6 | 6 | 8 | 8 | 8 | 8 | 8 | 10 | 16 | 16 | 16 | 32 |
| $Q_3$ | 4 | 6 | 6 | 6 | 8 | 8 | 8 | 8 | 8 | 8 | 8 | 10 | 16 | 16 | 16 | 32 |
| $Q_4$ | 6 | 6 | 6 | 8 | 8 | 8 | 10 | 10 | 10 | 10 | 10 | 16 | 20 | 20 | 20 | 64 |
| $Q_5$ | 8 | 8 | 8 | 8 | 8 | 8 | 10 | 10 | 10 | 10 | 10 | 16 | 20 | 20 | 20 | 64 |
| $Q_6$ | 8 | 10 | 10 | 10 | 10 | 10 | 10 | 10 | 10 | 10 | 10 | 16 | 20 | 20 | 20 | 64 |
| $Q_7$ | 10 | 10 | 10 | 10 | 12 | 12 | 12 | 12 | 12 | 12 | 12 | 16 | 20 | 20 | 20 | 64 |
| $Q_8$ | 10 | 10 | 10 | 12 | 12 | 12 | 14 | 14 | 14 | 14 | 14 | 20 | 20 | 20 | 32 | 64 |
| $Q_9$ | 10 | 12 | 12 | 12 | 14 | 14 | 14 | 14 | 14 | 14 | 14 | 20 | 20 | 20 | 32 | 64 |
| $Q_{10}$ | 12 | 12 | 12 | 14 | 14 | 14 | 16 | 16 | 16 | 16 | 16 | 20 | 20 | 20 | 32 | 64 |
| $Q_{11}$ | 12 | 14 | 14 | 14 | 14 | 14 | 16 | 16 | 16 | 16 | 16 | 20 | 20 | 20 | 32 | 64 |
| $Q_{12}$ | 12 | 14 | 14 | 14 | 16 | 16 | 16 | 16 | 16 | 16 | 16 | 20 | 32 | 32 | 32 | 64 |
| $Q_{13}$ | 12 | 14 | 14 | 16 | 16 | 16 | 20 | 20 | 20 | 24 | 24 | 24 | 32 | 32 | 64 | 64 |
| $Q_{14}$ | 12 | 14 | 14 | 16 | 20 | 20 | 24 | 24 | 24 | 24 | 24 | 32 | 48 | 48 | 64 | 64 |

METHOD AND APPARATUS FOR ENCODING AN IMAGE SIGNAL USING A MULTI-STAGE QUANTIZING NUMBER DETERMINER

BACKGROUND OF THE INVENTION

The present invention relates to encoding an image signal with highly efficient coding including orthogonal transformation and quantization; and in a particular application, the encoded image signal is recorded and reproduced by a digital VTR.

Digital VTRs digitize a video or image signal for recording on a magnetic tape. Since the bandwidth of a digital image signal is very wide, it is desirable to compress the digital image signal using highly efficient coding before recording it on the magnetic tape. Typically, a digital image signal is orthogonally transformed from its original time domain representation to a frequency domain representation. The transformed image data are compressed by quantizing, and then further compressed by variable length coding.

The amount of variable length encoded data varies from frame to frame, which makes it difficult to record such data in a fixed format on the magnetic tape. This problem is addressed by maintaining the amount of encoded data at an approximately constant amount per frame. More specifically, estimates of the amounts of encoded data which would result from using several different quantizing numbers are obtained. The optimal quantizing number is the one which results in the greatest amount of encoded data that is within a predetermined threshold. This optimal quantizing number is used by the quantizer to divide the transformed image data, thereby producing quantized data. Thus, the degree of compression provided by the quantizer is controlled through selection of an optimal quantizing number so that an approximately constant amount of data per frame is produced.

A conventional circuit for determining the optimum quantizing number is shown in FIG. 1. Frequency spectrum coefficient data representing the image signal, produced by an orthogonal transformation of the image signal, such as a discrete cosine transformation (DCT), are supplied to an input terminal 201. These coefficient data are arranged in blocks of 8 pixels×8 lines, as shown in FIG. 2, also referred to as orthogonally transformed image data blocks.

The blocks of transformed image data are supplied to a buffer memory 202, which has sufficient capacity to store, for example, 15 macro blocks. A macro block is comprised of six transformed image data blocks representing the same portion of the image signal. Four of these blocks have luminance information and two of these blocks have color difference information. A typical macro block is shown in FIG. 3.

The transformed image data are also supplied from the input terminal 201 to code amount estimating circuits 203-0 to 203-14, shown in FIG. 1, each of which includes a quantizer and estimates the amount of encoded data resulting from quantizing with one of a group of different quantizing numbers, also referred to as quantizing steps, #Q0, #Q1 . . . #Q14. The quantizing numbers progressively increase, with #Q0 having the smallest value and #Q14 having the largest value. In other words, the intensity or degree of estimated data compression progressively increases from estimating circuit 203-0 to estimating circuit 203-14.

The outputs of the code amount estimating circuits 203-0 to 203-14 are supplied to respective input terminals of comparison circuits 204-0 to 204-14. A target code amount is also supplied to the comparison circuits 204-0 to 204-14 from an input terminal 209. The target code amount is a target value for the amount of encoded data corresponding to an encoding set, also referred to as a buffering unit, having for example, 15 macro blocks. It is preferable that the amount of encoded data have the largest possible value which does not exceed the target code amount.

In the comparison circuits 204-0 to 204-14, the estimated amounts of quantized data corresponding to the respective quantizing numbers #Q0 to #Q14 are compared with the relevant target code amount. The outputs of the comparison circuits 204-0 to 204-14 are supplied to a quantizer determining circuit 205 which determines an optimum quantizing number.

For example, if each amount estimated by the code amount estimating circuits 203-0 to 203-5 is larger than the target code amount and each amount estimated by the code amount estimating circuits 203-6 to 203-14 is smaller than the target code amount, then the quantizing number #Q6 used in the code amount estimating circuit 203-6 is determined to be the optimum quantizing number, since it corresponds to an amount of encoded data which is the closest to and less than the target code amount.

The optimum quantizing number is supplied to a quantizer 206 to establish the quantizing level therefor, and then the data for an encoding set are read from the buffer memory 202 to the quantizer 206. The blocks of transformed image data in the encoding set are quantized by the quantizer 206 using the optimum quantizing number. The characteristic of the quantizer 206 is the same as that of each quantizer used in the code amount estimating circuits 203-0 to 203-14. The quantized data are supplied from the quantizer 206 to a variable length code encoding circuit 207, which encodes the quantized data using a variable length code such as a Huffman code. The variable length encoded data are output through an output terminal 208.

In the conventional VTR circuit for determining an optimum quantizing number, described above, one code amount estimating circuit is used for each of the quantizing numbers being evaluated. In such circuit construction, the number of code amount estimating circuits is large, which increases the circuit scale.

OBJECTS AND SUMMARY OF THE INVENTION

Therefore, an object of the present invention is to provide a method and an apparatus for encoding an image signal which avoids the aforementioned disadvantages of the prior art.

Another object of the present invention is to encode an image signal in a way which permits the circuit scale to be reduced.

In accordance with this invention, an image signal is encoded by segmenting it into a plurality of image blocks, orthogonally transforming these image blocks, quantizing each orthogonally transformed image data block in an encoding set of orthogonally transformed image data blocks using an optimum quantizing number, and encoding the quantized blocks using a variable length code. The optimum quantizing number is determined by selecting one of a first plurality of quantizing numbers estimated to produce a first optimal amount of encoded data for the encoding set of blocks of orthogonally transformed image data, then determining as the optimum quantizing number the one quantizing number of a second plurality of quantizing numbers, having values determined as a function of the value of the selected quantizing number, which is estimated to produce a second optimal amount of encoded data for the encoding set. Since quantizing numbers are evaluated in at least two stages, the number of quantizing numbers which can be evaluated is not limited to the number of code amount estimating circuits. Thus, the circuit scale of an apparatus according to the present invention may be reduced.

The above, and other objects, features and advantages of the present invention will be apparent in the following detailed description of the preferred embodiments of the present invention when read in conjunction with the accompanying drawings in which corresponding parts are identified by the same reference numeral.

BRIEF DESCRIPTION OF THE DRAWINGS

FIG. 8 is a schematic diagram illustrating sets of quantizing numbers to which reference will be made in describing the present invention;

DETAILED DESCRIPTION OF THE PREFERRED EMBODIMENTS

Figure 1:
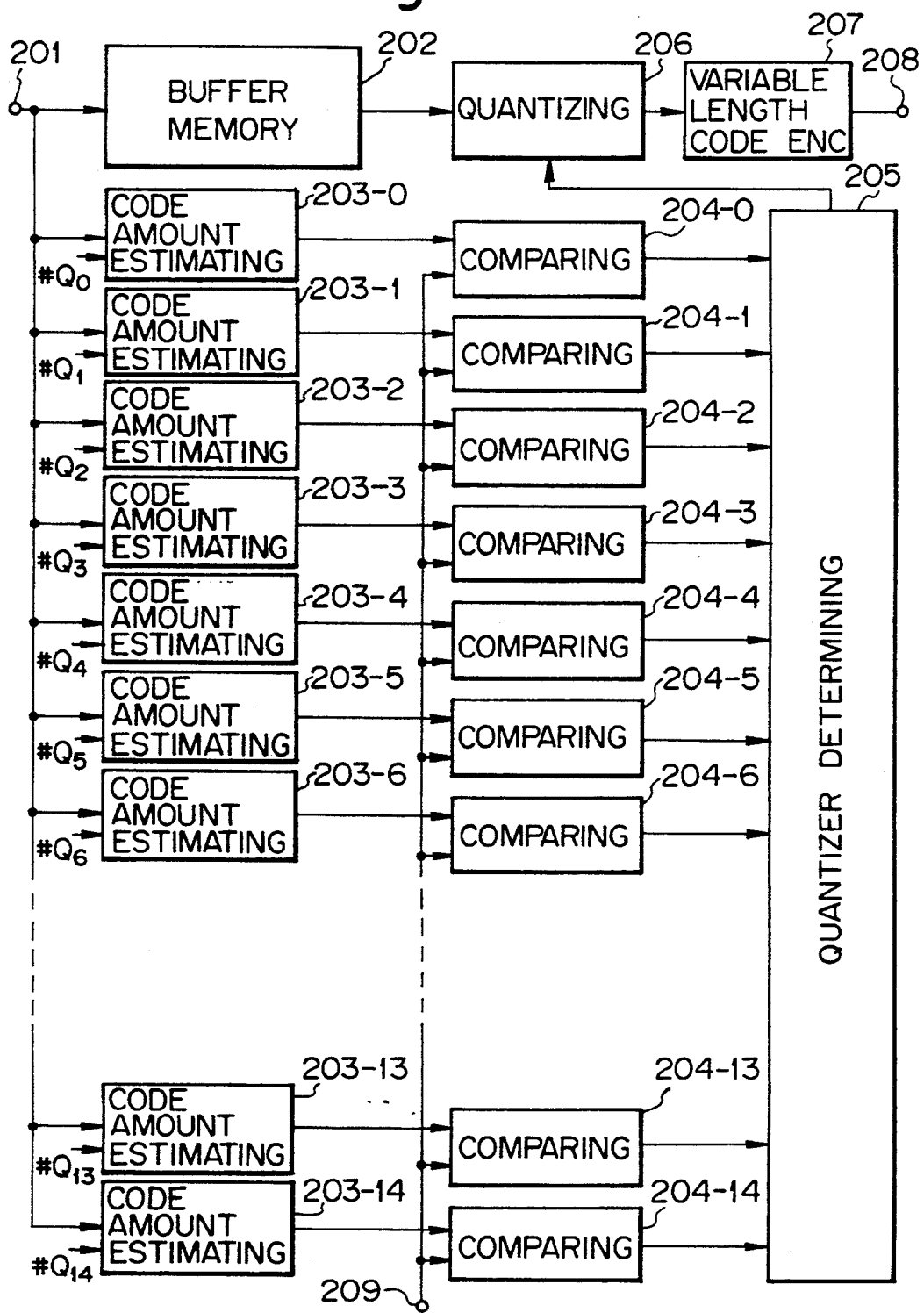
FIG. 1 is a block diagram of an example of a conventional circuit for determining a quantizing number.
Figure 2:
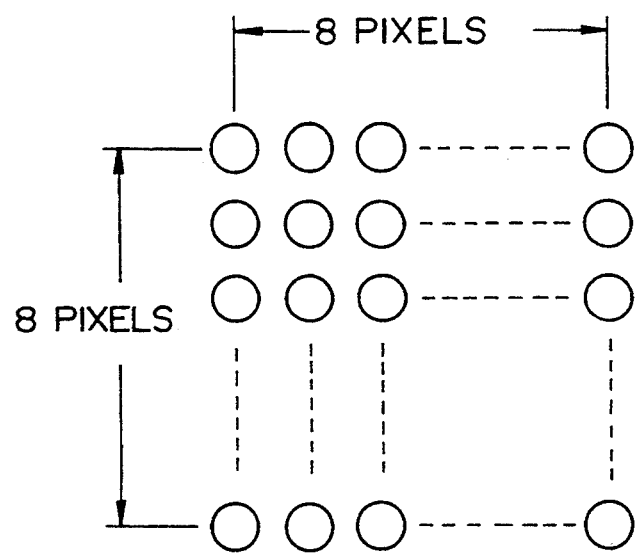
FIG. 2 is a schematic diagram showing a block of orthogonally transformed image data.
Figure 3:
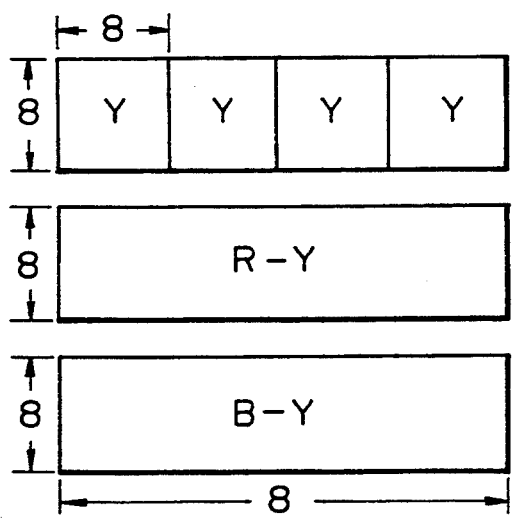
FIG. 3 is a schematic diagram showing a macro block.
Figure 4:
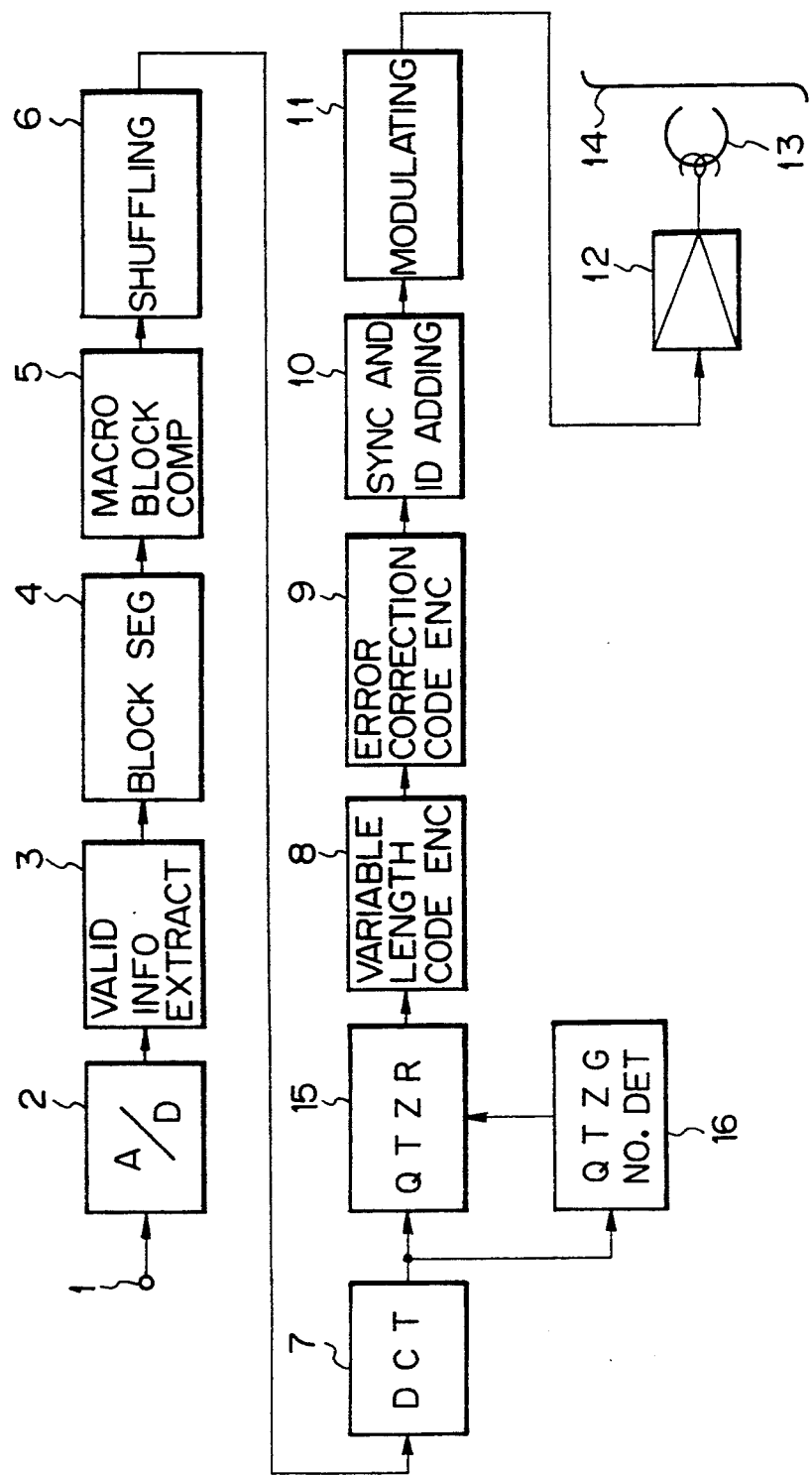
FIG. 4 is a block diagram showing the recording system of a digital VTR according to the present invention.

Referring now to the drawings, and in particular to FIG. 4, there is illustrated a digital VTR according to the present invention. The apparatus illustrated in FIG. 4 is adapted to encode a video or image signal, and to record the encoded signal on a magnetic tape 14.

The to-be-recorded video signal is supplied through an input terminal 1 to an A/D converter 2, which is adapted to digitize the video signal. The digitized video signal is supplied to a valid information extracting circuit 3 which removes redundant components from the input video signal. That is, the circuit 3 extracts only components which constitute information necessary to reconstruct the image, thereby reducing the amount of data corresponding to the image signal.

For example, the amount of information needed to respresent the color difference signals is less than the amount of information needed to represent the luminance signal. Furthermore, inaccuracies in the color difference signals U and V (or R-Y and B-Y) are less noticeable than inaccuracies in the luminance signal Y. Consequently, the amount of information needed to represent the color difference signals can be further reduced. Moreover, formatting portions of the video signal, such as horizontal synchronization signals, horizontal blanking interval signals, vertical synchronization signals, and vertical blanking interval signals, need not be transmitted, and so are removed by the circuit 3.

The output of the valid information extracting circuit 3 is supplied to a block segmenting circuit 4 that is adapted to form blocks of pixel data which are suited to being orthogonally transformed. Each of the pixel data is comprised of eight bits.

The blocks of pixel data are supplied to a macro block composing circuit 5 which is adapted to assemble blocks of luminance signal Y and color difference signals U and V representing the same spatial area in the image signal, thereby forming macro blocks. Four times as much pixel data are used to represent the luminance signal Y as to represent each of the color difference signals U and V. Processes such as shuffling and interpolating can be more readily performed when the image signal data is arranged in macro blocks.

The macro blocks formed by the macro block composing circuit 5 are supplied to a shuffling circuit 6 which is adapted to collect three immediately adjacent macro blocks to form a super macro block, and to perform shuffling in the unit of a super macro block. That is, the macro blocks in a super macro block remain together during shuffling. Since a super macro block corresponds to a large area of the image, reproduced images can be easily seen even in a cue mode or a review mode of the digital VTR.

The shuffled image data blocks are supplied from the shuffling circuit 6 to a DCT transforming circuit 7 that is adapted to orthogonally transform each block of pixel data into coefficient data blocks using a discrete cosine transformation, thereby compressing the amount of data needed to represent the video signal.

Since an image represented in one frame contains portions with correlation, after the image signal is orthogonally transformed into coefficient data, the level of the DC component becomes large, whereas the level of the AC components becomes very small. By designating a proper number of bits for the coefficient data, taking human visual characteristics into consideration, the amount of information necessary to reconstruct the image can be substantially decreased.

The orthogonally transformed image data blocks are supplied to a quantizing number determining circuit 16 which is adapted to determine an optimum quantizing number, that is, a number which results in compression of the transformed image data to an amount which fits in fixed length areas on the magnetic tape 14. A suitable structure for the quantizing number determining circuit 16 is shown in detail in FIG. 5, and discussed below.

The optimum quantizing number and the blocks of orthogonally transformed image data from the DCT transforming circuit 7 are supplied to a quantizer 15, which is suitable for quantizing the blocks using the optimum quantizing number so that the total amount of encoded data in one encoding set is within a predetermined threshold. An encoding set, also referred to as a buffering unit, is comprised of a predetermined number of blocks of transformed image data, for example, 15 macro blocks. The predetermined threshold pertains to the amount of quantized and variable length encoded data representing the encoding set. A suitable structure for the quantizer 15 is discussed in detail below.

The quantized data are supplied from the quantizer 15 to a variable length code encoding circuit 8 which is adapted to encode the quantized data using a variable length code. A suitable structue for the variable length code encoding circuit 8 is discussed below.

The variable length encoded data are supplied to an error correction code encoding circuit 9 that appends error correction codes thereto. The error correction encoded data, also referred to as record data, are supplied to a sync and ID adding circuit 10 that adds a sync signal and an ID signal thereto.

The output of the sync and ID signal adding circuit 10 is supplied to a modulating circuit 11 which is adapted to modulate the record data according to a predetermined modulation system. The modulated signal is supplied through a recording amplifier 12 to a head 13 for recording on the magnetic tape 14.

The optimum quantizing number determining circuit 16 will now be described.

Figure 5:
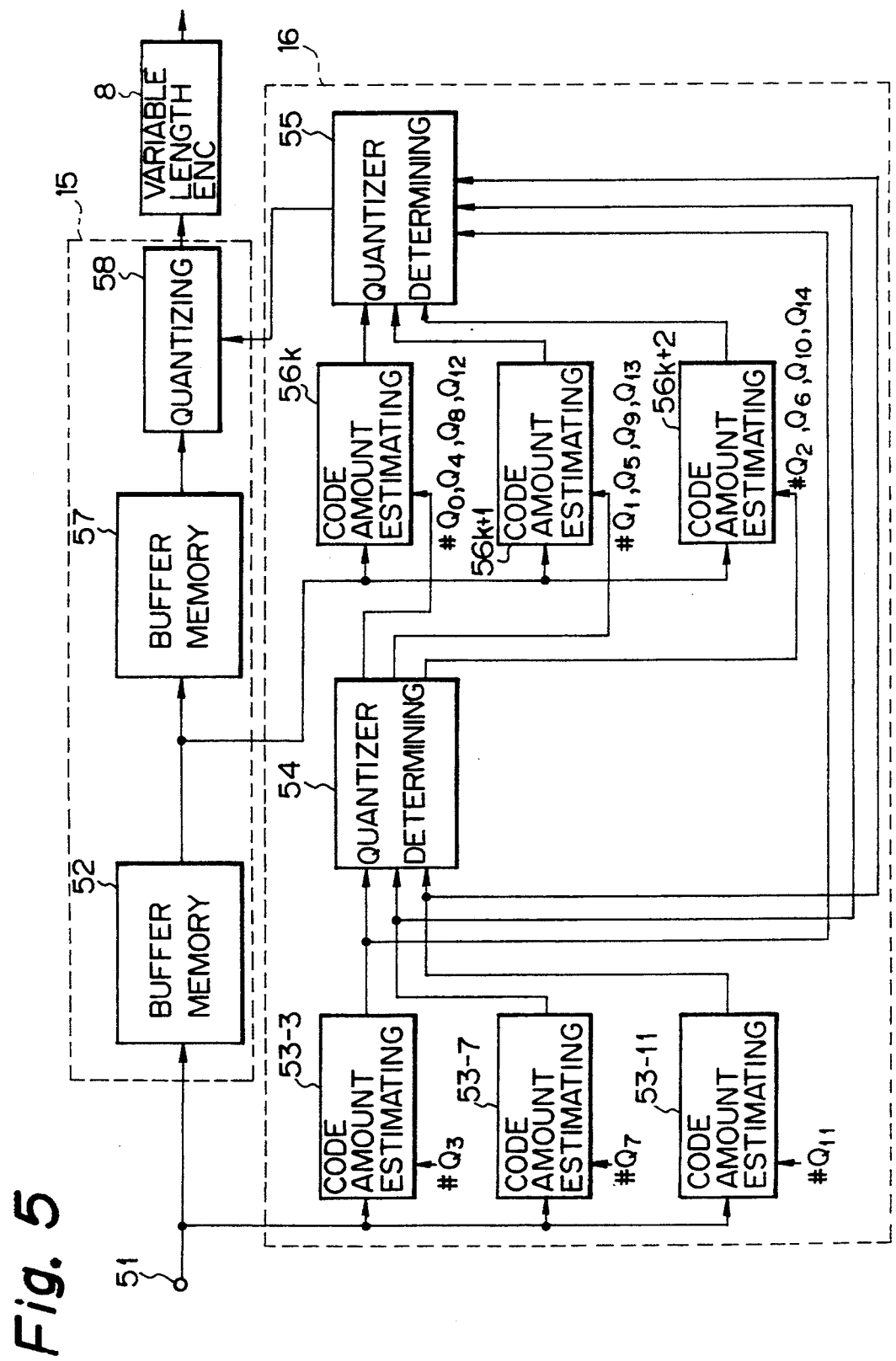
FIG. 5 is a block diagram of an embodiment according to the present invention.

FIG. 5 shows the quantizer 15, variable length code encoding circuit 8, and the optimum quantizing number determining circuit 16, which is comprised of a first quantizing number determining stage and a second quantizing number determining stage. Each quantizing number determining stage includes a plurality of code amount estimating circuits which supply respective code amount estimates to a quantizer determining circuit. Code amount estimating circuits 53-3, 53-7, 53-11 and quantizer determining circuit 54 comprise the first stage of optimum quantizing number determining circuit 16, while code amount estimating circuits 56k, 56k+1, 56k+2 and quantizer determining circuit 55 comprise the second stage.

Figure 6:
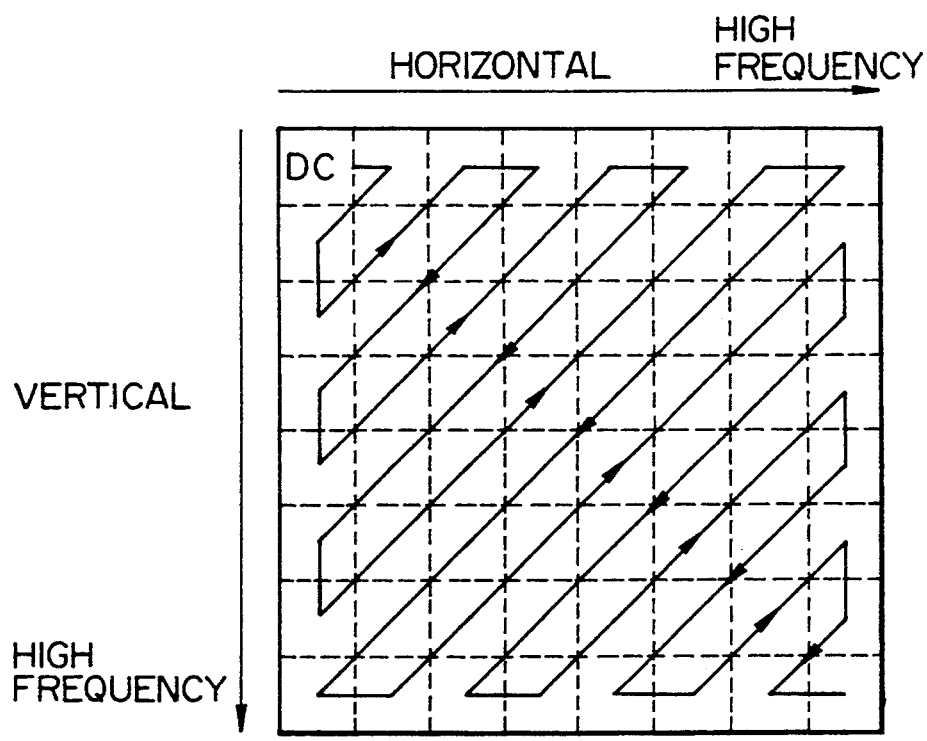
FIG. 6 is a schematic diagram illustrating scanning of orthogonally transformed image data to which reference will be made in describing the present invention.

The spectrum data, or DCT coefficients of the blocks of orthogonally transformed image data, from the DCT transforming circuit 7 are scanned in a zigzag manner, as shown in FIG. 6, and the scanned coefficients are supplied through an input terminal 51 of FIG. 5 to a buffer memory 52 and to the code amount estimating circuits 53-3, 53-7, 53-11.

Quantizing numbers #Q3, #Q7, #Q11 are also supplied to the code amount estimating circuits 53-3, 53-7, 53-11, respectively, which are adapted to estimate an amount of data resulting from quantizing the spectrum data in an encoding set with the respective quantizing number supplied thereto, and to determine whether the respective estimated amount is less than a predetermined target amount.

Based on the determinations from the code amount estimating circuits 53-3, 53-7, 53-11, the quantizer determining circuit 54 selects one of the quantizing numbers #Q3, #Q7, #Q11 as a selected quantizing number, and then chooses values for the quantizing numbers supplied to each of the amount estimating circuits 56k, 56k+1, 56k+2. As shown in FIG. 5, these values are chosen from the quantizing numbers {#Q0, #Q4, #Q8, #Q12}, {#Q1, #Q5, #Q9, #Q13} and {#Q2, #Q6, #Q10, #Q14}, respectively. The process for choosing quantizing numbers is discussed below.

The transform coefficients of the blocks of orthogonally transformed image data are supplied from the buffer memory 52 to a buffer memory 57 and to the code amount estimating circuits 56k, 56k+1, and 56k+2, which function in the same manner as the code amount estimating circuits 53-3, 53-7, 53-11. A circuit structure which may be used for each of the code amount estimating circuits is presented below.

The determinations, regarding whether the amounts of encoded data estimated by the code amount estimating circuits 56k, 56k+1, 56k+2, respectively, are less than the predetermined target value, are supplied to the quantizer determining circuit 55. Similar determinations from the code amount estimating circuits 53-3, 53-7, 53-11 are also supplied to the quantizer determining circuit 55.

The quantizer determining circuit 55 is adapted to determine an optimum quantizing number, based on the determinations from the code amount estimating circuits 53-3, 53-7, 53-11, 56k, 56k+1, 56k+2. As can be seen from FIG. 5, the optimum quantizing number will be one of #Q0, #Q1 . . . #Q14. In operation, as discussed in detail below, the optimum quantizing number is actually selected from among the three quantizing numbers used by the code amount estimating circuits 56k, 56k+1, 56k+2 in the second stage and the selected quantizing number selected by the quantizer determining circuit 54. That is, the number of quantizing numbers, from which an optimal quantizing number is determined, is not restricted to exactly the number of code amount estimating circuits.

When an optimum quantizing number is determined by the two stage method discussed above, the number of code amount estimating circuits necessary for determining an optimum quantizer is less than the number of code amount estimating circuits needed in the prior art circuit construction.

Instead of one quantizing number, a set of quantizing numbers or coefficients corresponding to different areas of a block of transformed image data may be used, allowing the degree of compression of the coefficients in each block to be based on their perceptibility in human vision. In other words, since high frequency components are less noticeable than low frequency components, a set of quantizing numbers may include large divisors for high frequency components and smaller divisors for low frequency components so that higher frequency components are compressed more than low frequency components.

Figure 7:
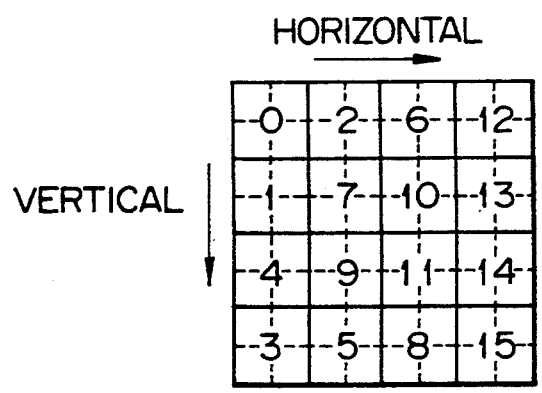
FIG. 7 is a schematic diagram illustrating areas of an block of orthogonally transformed image data to which reference will be made in describing the present invention.

For example, a block of transformed image data may be considered to have spectral areas 0, 1 . . . 15, as shown in FIG. 7. Each spectral area of FIG. 7 includes 4 of the 64 coefficients in a block of coefficients shown in FIG. 6. Each quantizing number #Q0, #Q1 . . . #Q14 may be a set of sixteen quantizing coefficients, with one coefficient for each of the spectral areas of the block of transformed image data, as shown in FIG. 8. The values of the quantizing coefficients in the sets #Q0, #Q1 . . . #Q14 increase as the frequency of the spectral components in the transformed image data increases, in both horizontal and vertical directions. Thus, data representing higher frequencies are compressed more than data representing lower frequencies. Correspondingly, the amount of encoded data representing higher frequencies is decreased more than the amount of encoded data representing lower frequencies.

The transform coefficients of the blocks from the buffer memory 57 and the optimum quantizing number determined by the quantizer determining circuit 55 are supplied to a quantizer 58, which is adapted to quantize the spectral components in these blocks using the optimum quantizing number, thereby producing quantized data. The quantized data are supplied to the variable length code encoding circuit 8, and then recorded on the magnetic tape 14 as described above.

The process for choosing quantizing numbers will now be discussed.

A first series of m quantizing numbers is defined for the first stage. Preferably, these numbers are approximately equally spaced, that is, are separated from each other by a predetermined interval i. Thus, the first series of m quantizing numbers has values:

$$a \; a+i \; a+2i \ldots a+(m-1)i$$

The amount of encoded data corresponding to each of these quantizing numbers is estimated. The quantizing number corresponding to a greatest amount of encoded data which does not exceed a target threshold is chosen as a selected quantizing number. If all estimated amounts exceed the target threshold, then the largest quantizing number, corresponding to the smallest amount of encoded data, is chosen as the selected quantizing number.

Values for a second series of n quantizing numbers for the second stage are defined as a function of the selected quantizing number. Preferably, these numbers differ by an interval such that they are equally spaced between the quantizing numbers in the first series, that is, an interval of approximately $j=(i-1)/n$. Generally, the quantizing numbers in the second series are smaller in value than, or precede, the selected quantizing number. For example, if $a+2$ is chosen as the selected quantizing number, the second series of quantizing numbers has values:

$$a+2-nj \; a+2-(n-1)j \; a+2-(n-2)j \ldots a+2-j$$

In the case where all of the estimated amounts in the first stage exceeded the target threshold, the quantizing numbers in the second series are larger in value than, or follow, the selected quantizing number, and have values:

$$a+(m-1)i+j \; a+(m-1)i+2j \ldots a+(m-1)i+nj$$

An amount of encoded data corresponding to each of the quantizing numbers in the second stage is estimated. The quantizing number, from among the quantizing numbers in the second stage and the selected quantizing number from the first stage, corresponding to the greatest amount of encoded data within the target threshold is determined to be the optimal quantizing number.

The process of determining an optimal quantizing number will now be discussed with respect to four examples.

Figure 9:
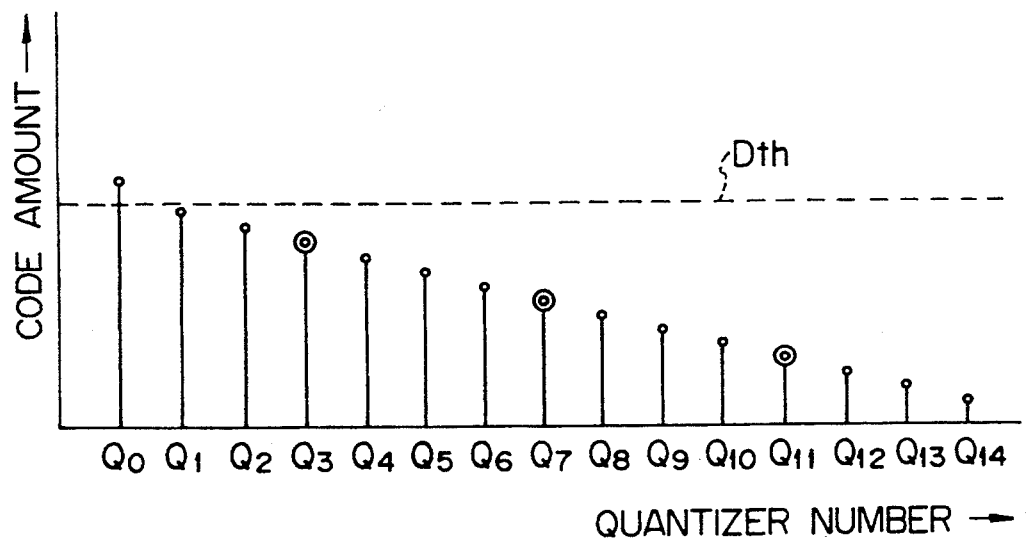
FIGS. 9–12 are graphs illustrating respective relationships between quantizing numbers and a threshold value, referred to in describing the embodiment of the present invention shown in FIG. 5.

In a first example, shown in FIG. 9, the amounts of encoded data resulting from use of the quantizing numbers #Q3, #Q7 and #Q11 are all less than a predetermined target amount Dth. Consequently, the quantizer determining circuit 54 selects #Q3 as a selected quantizing number. Then the quantizer determining circuit 54 chooses #Q0, #Q1 and #Q2 as quantizing numbers for use by the code amount estimating circuits 56k, 56k+1 and 56k+2, respectively. The one of the quantizing numbers #Q0, #Q1, #Q2, Q3 which results in the greatest amount of encoded data that is within the target amount Dth is determined to be the optimum quantizing number by the quantizer determining circuit 55. In this example, #Q1 is determined to be the optimum quantizing number.

Figure 10:
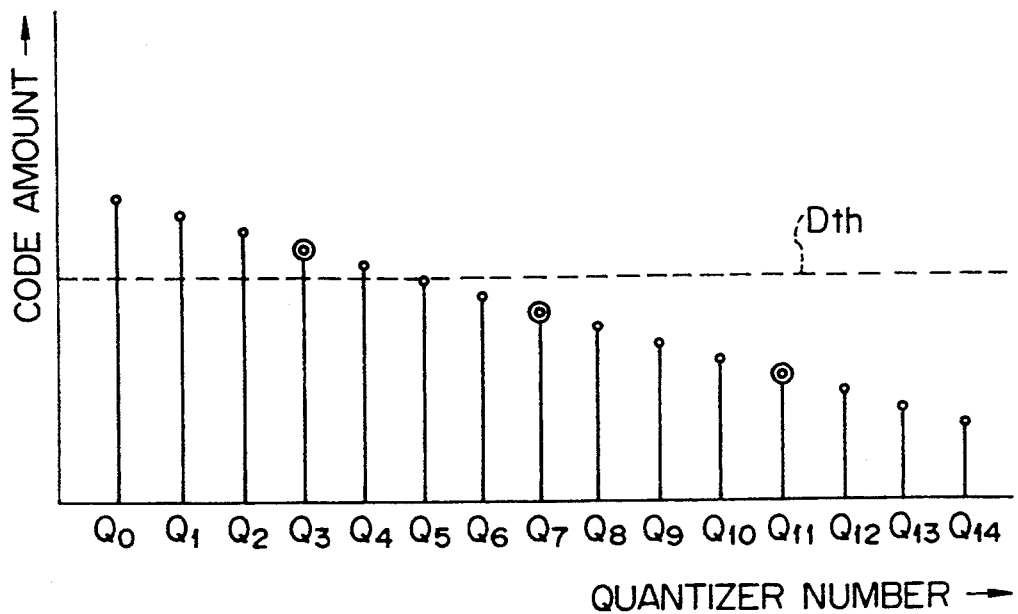

In a second example, shown in FIG. 10, the amount of encoded data resulting from use of the quantizing number #Q3 is greater than the target amount Dth, while the amounts of encoded data corresponding to the quantizing numbers #Q7 and #Q11 are less than the target amount Dth. Consequently, the quantizer determining circuit 54 selects #Q7 as a selected quantizing number. Then the quantizer determining circuit 54 chooses #Q4, #Q5 and #Q6 as quantizing numbers for use by the code amount estimating circuits 56k, 56k+1 and 56k+2, respectively. The one of the quantizing numbers #Q4, #Q5, #Q6, #Q7 which results in the greatest amount of encoded data that is within the target amount Dth is determined to be the optimum quantizing number by the quantizer determining circuit 55. In this example, #Q5 is determined to be the optimum quantizing number.

Figure 11:
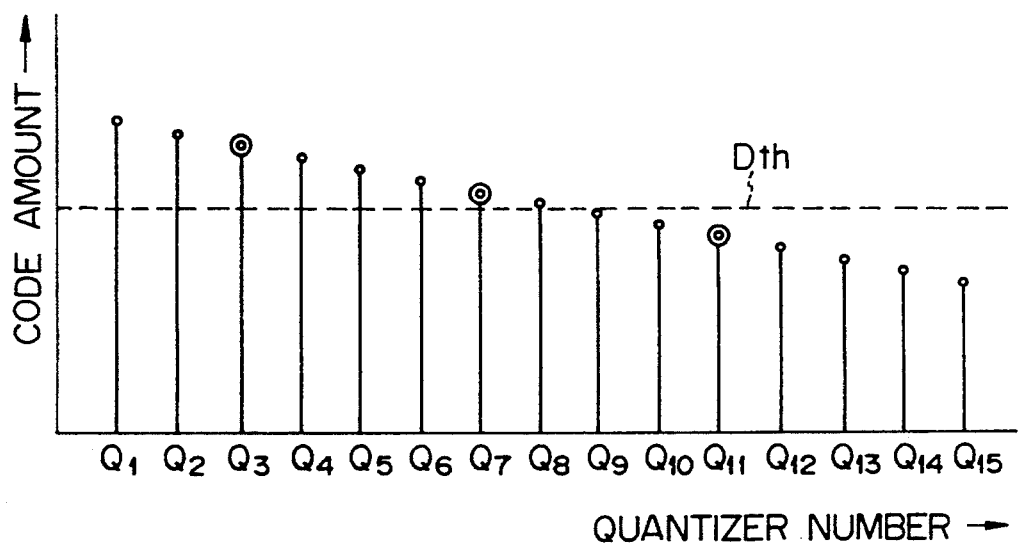

In a third example, shown in FIG. 11, the amounts of encoded data resulting from use of the quantizing numbers #Q3 and #Q7 are greater than the target amount Dth, while the amount of encoded data corresponding to the quantizing numbers #Q11 is less than the target amount Dth. Consequently, the quantizer determining circuit 54 selects #Q11 as a selected quantizing number. Then the quantizer determining circuit 54 chooses #Q8, #Q9 and #Q10 as quantizing numbers for use by the code amount estimating circuits 56k, 56k+1 and 56k+2, respectively. The one of the quantizing numbers #QS, #Q9, #Q10, #Q11 which results in the greatest amount of encoded data that is within the target amount Dth is determined to be the optimum quantizing number by the quantizer determining circuit 55. In this example, #Q9 is determined to be the optimum quantizing number.

Figure 12:
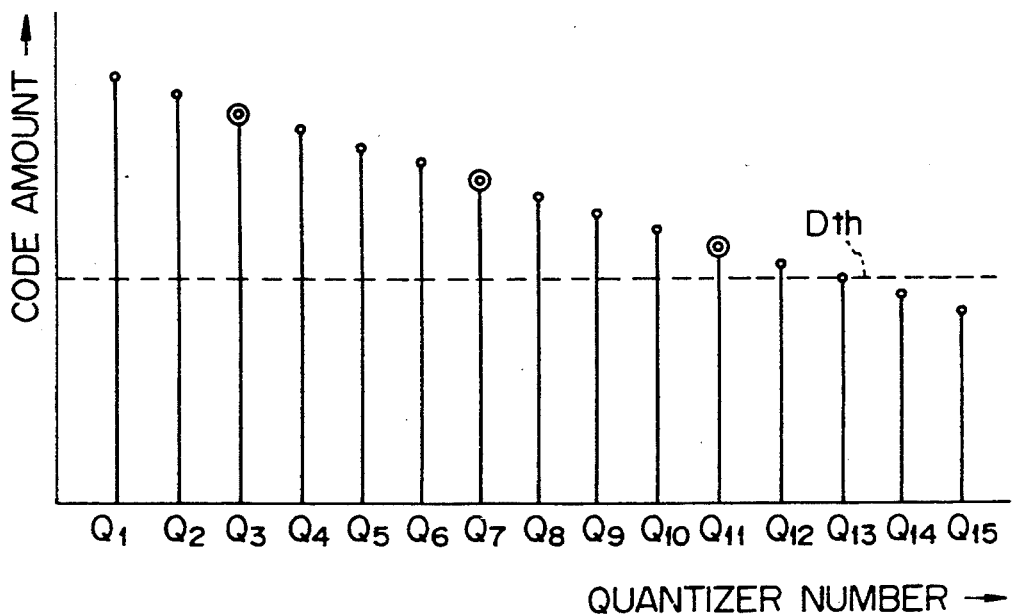

In a fourth example, shown in FIG. 12, the amounts of encoded data resulting from use of the quantizing numbers #Q3, #Q7 and #Q11 are all greater than the target amount Dth. Nevertheless, the quantizer determining circuit 54 selects #Q11 as a selected quantizing number. Then the quantizer determining circuit 54 chooses #Q12, #Q13 and #Q14 as quantizing numbers for use by the code amount estimating circuits 56k, 56k+1 and 56k+2, respectively. The one of the quantizing numbers #Q12, #Q13, #Q14 which results in the greatest amount of encoded data that is within the target amount Dth is determined to be the optimum quantizing number by the quantizer determining circuit 55. In fact, the quantizing number #Q11 is available to be chosen, but will not be, since it results in too much encoded data. In this example, #Q14 is determined to be the optimum quantizing number.

Finding the least number of code amount estimating circuits will now be discussed.

Let m represent the number of code amount estimating circuits in the first stage, and n represent the number of code amount estimating circuits in the second stage. The total number of code amount estimating circuits $\alpha$ is:

$$\alpha = m + n$$

The total number of quantizing numbers P from which the optimal quantizing number is chosen is:

$$P = m + n + m \cdot n$$

That is, there are m quantizing numbers in the first stage; each of these m numbers has n quantizing numbers preceding it, giving a total of m·n, and there are n numbers following the last of the m numbers.

Rearranging, $$n = \frac{(P - m)}{m + 1}$$

Substituting, $$\alpha = \frac{m^2 + P}{m + 1}$$

Figure 13:
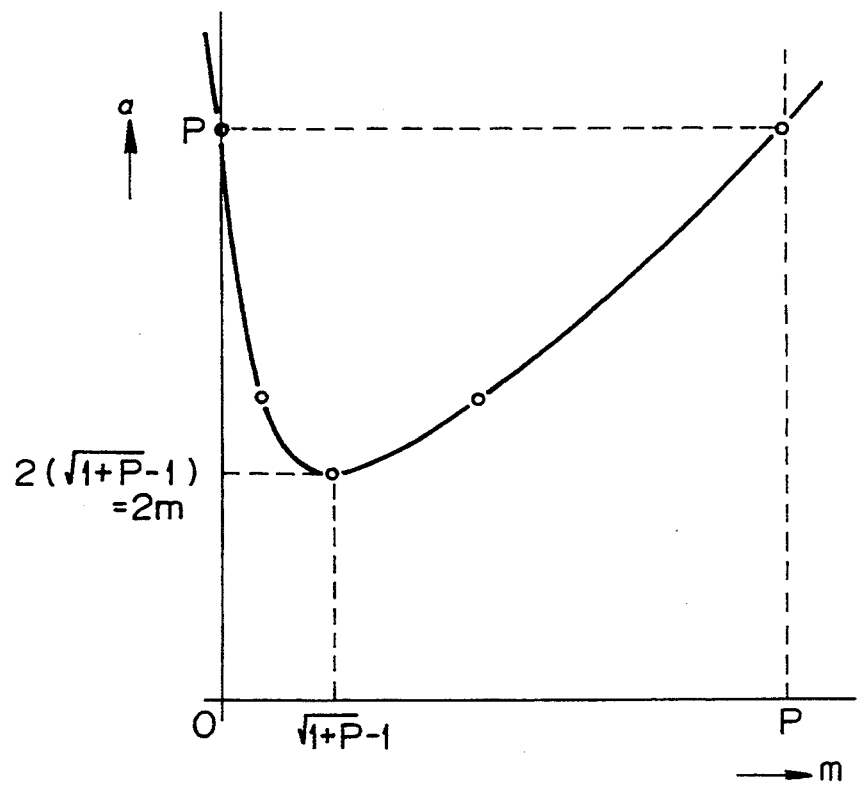
FIG. 13 is a graph showing the relationship between the total number of code estimating circuits and the number of code estimating circuits in the first stage of the embodiment of the present invention shown in FIG. 5.

This relationship, $\alpha$ as a function of m, is shown in FIG. 13. The minimum value of $\alpha$ corresponds to use of the least number of code estimating circuits. The minimum value occurs at the point where the slope of the curve shown in FIG. 13 is zero:

$$0 = \frac{d\alpha}{dm}$$

$$0 = (m + 1)^{-1} \frac{d}{dm}(m^2 + P) + (m^2 + P)\frac{d}{dm}(m + 1)^{-1}$$

$$0 = m^2 + 2m - P$$

At the minimum value of $\alpha$, $$m = (1 + P)^{\frac{1}{2}} - 1$$

At this point, $\alpha = 2m$. Since $\alpha = m + n$, at the minimum value of $\alpha$, $$m = n = (1 + P)^{\frac{1}{2}} - 1$$

For example, for the case of 15 quantizing numbers, such as #Q0 to #Q14, in the conventional single-staged structure for a quantizing number determining circuit, 15 code amount estimating circuits are required. However, in a multi-stage quantizing number determining circuit according to the present invention, using a total of only six code amount estimating circuits, three in each of the first and second stages, an optimum quantizing number can be selected from among 15 quantizing numbers. More generally, in the conventional structure, the ratio of the number of code amount estimating circuits to the number of quantizing numbers which are evaluated is 1/1, whereas in a two stage structure according to the present invention, the ratio of the optimal number of code amount estimating circuits to the number of quantizing numbers is:

$$\frac{\alpha}{P} = \frac{m + n}{m + n + m \cdot n}$$

$$= \frac{2m}{2m + m^2}$$

$$= \frac{2}{2 + m}$$

The structure of each of the code amount estimating circuits 53-3, 53-7, 53-11, 56k, 56k+1, 56k+2 will now be discussed. As will be seen, the structure of the each of the code amount estimating circuits is similar to the structure of the quantizing circuit and variable length code encoding circuit used to convert the blocks of orthogonally transformed image data into encoded data.

Figure 14:
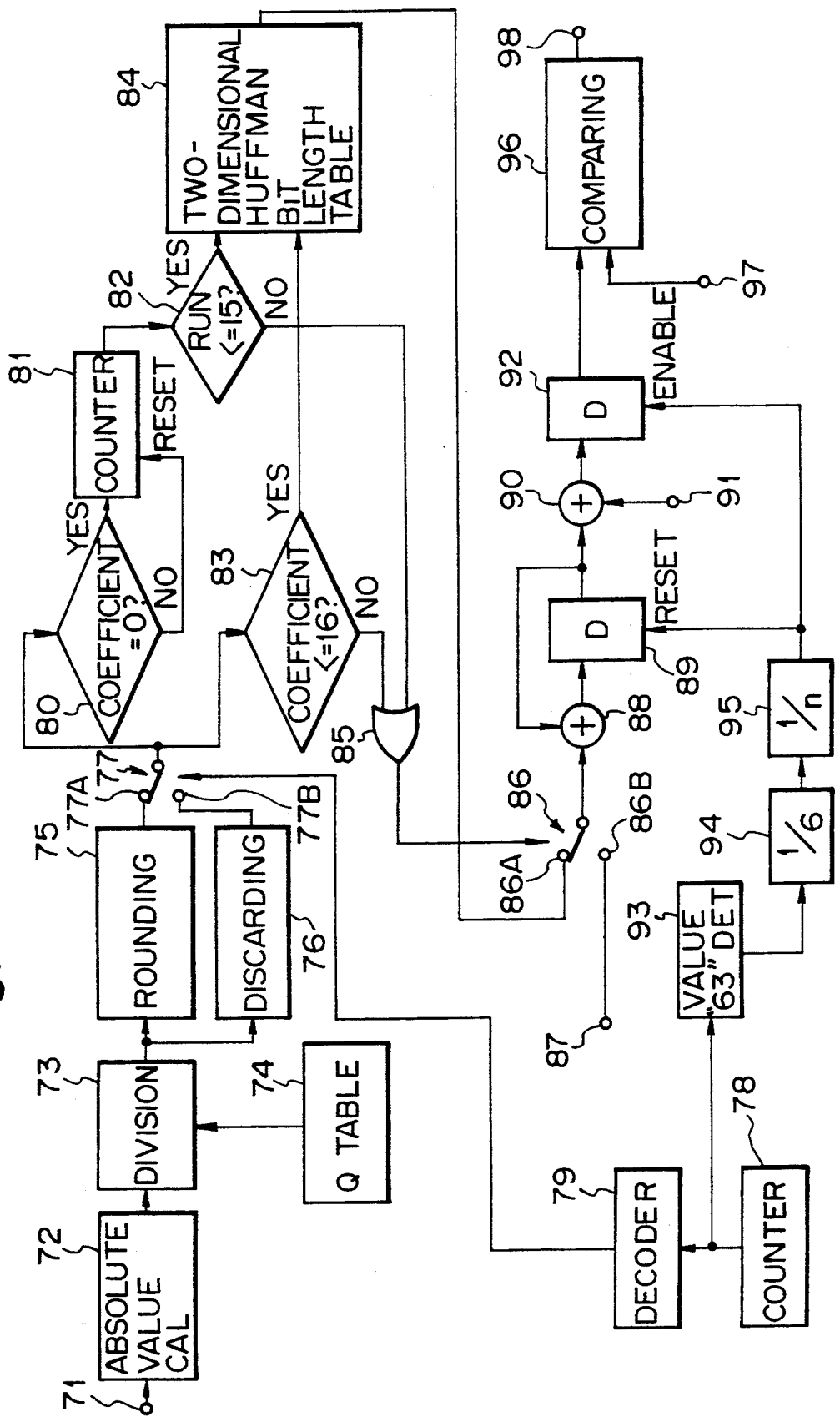
FIG. 14 is a block diagram showing an example of a code amount estimating circuit in the embodiment of the present invention shown in FIG. 5.

FIG. 14 shows a circuit structure suitable for each of the code amount estimating circuits 53-3, 53-7, 53-11, 56k, 56k+1, 56k+2. The circuit of FIG. 14 essentially quantizes the blocks of orthogonally transformed image data in an encoding set using one quantizing number so that an amount of variable length encoded data corresponding to the quantized data can be estimated. Then, this estimated amount is compared with a target amount of encoded data.

Orthogonally transformed image data, that is, spectral coefficients, each represented by, for example, 10 bits are supplied through an input terminal 71 to an absolute value calculating circuit 72 which is adapted to remove the respective sign bits from each transform coefficient and to output absolute value data of nine bits to a division circuit 73.

A quantizer table 74 outputs one of 15 quantizing numbers to the division circuit 73 which is adapted to divide the absolute value data by the quantizing number so as to quantize the absolute value data. Most of the quantized data has a value of zero. As previously discussed, each of the quantizing numbers may be a set of quantizing coefficients corresponding to areas of a block of transformed image data.

The quantized data from the division circuit 73 are supplied to a rounding circuit 75 and a discarding circuit 76. The rounding circuit 75 rounds the remainder received from the division circuit 73, and supplies the quantized data, after rounding, to a terminal 77A of a switching circuit 77. The discarding circuit 76 discards the remainder received from the division circuit 73, and supplies the quantized data with the remainder discarded to a terminal 77B of the switching circuit 77.

A counter 78 counts values from "0" to "63" in accordance with each address of a block of transformed image data, such as the block shown in FIG. 6, and supplies these values to a decoder 79 which is adapted to provide an address indicating one of terminals 77A, 77B to the switching circuit 77 based on the count value. In horizontal and vertical high frequency areas, such as areas #3, #5, #8, #12, #13, #14, #15 shown in FIG. 7, the remainder is discarded. In other areas, the remainder is rounded. The switching circuit 77 is switched in accordance with the address provided from decoder 79. Specifically, when the count value indicates that data for areas #3, #5, #8, #12, #13, #14, #15 are being quantized, the switching circuit 77 is switched to terminal 77B. For addresses in other areas, the switching circuit 77 is switched to terminal 77A.

The thus quantized data from the switching circuit 77 are supplied to a decision circuit 80 which is adapted to detect whether the quantized data have a value of zero. When the quantized data has a value of zero, a counter 81 increments its count by one. When the quantized data has a non-zero value, the counter 81 is reset. In this manner, the counter 81 obtains the length of a run of quantized data having a value of zero.

Each zero value data run length from the counter 81 is supplied to a detecting circuit 82 which is adapted to determine whether the run length exceeds an encodable range by detecting whether the run length has a value less than or equal to fifteen. When the run length is fifteen or less, the run length is within an encodable range, and so the run length of, for example, four bits, is supplied to a two-dimensional Huffman bit length table 84. When the run length is larger than fifteen, an appropriate signal is supplied to an OR gate 85, indicating that the run length exceeds the encodable range.

The quantized data from the switching circuit 77 are also supplied to a detecting circuit 83 which is adapted to detect whether or not the amplitude of the quantized data exceeds an encodable range by detecting whether the value of the quantized data is less than or equal to sixteen. When the amplitude is sixteen or less, the amplitude is within an encodable range, and so the quantized data, represented by four bits, are supplied to the two-dimensional Huffman bit length table 84. When the amplitude of the quantized data is larger than sixteen, an appropriate signal is supplied to the OR gate 85, indicating that the amplitude exceeds the encodable range.

Figure 15:
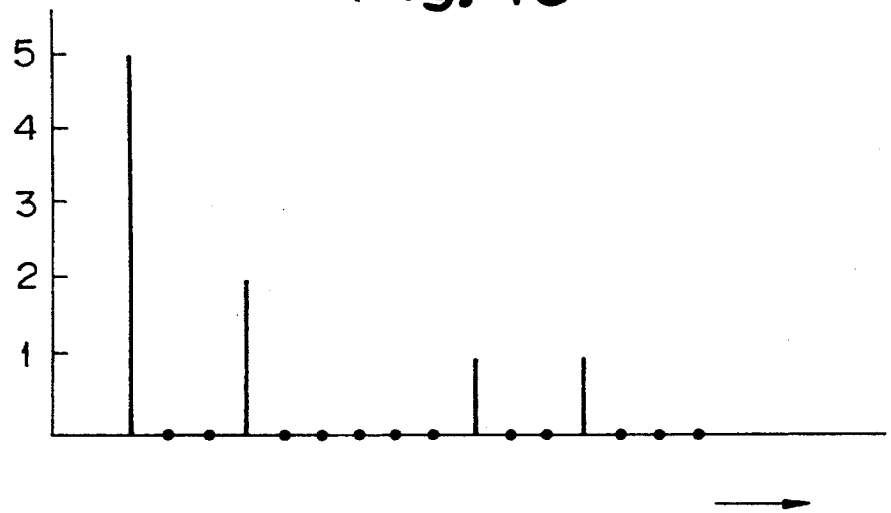
FIG. 15 is a schematic diagram illustrating a sequence of quantized data, to which reference will be made in describing variable length code encoding according to the present invention.

The two-dimensional Huffman bit length table 84 is adapted to obtain the number of bits of encoded data in an encoding set, based on the zero value run lengths from the counter 81 and the amplitude values from the switching circuit 77, and to supply this number to a switching circuit 86. For example, FIG. 15 shows a sequence of quantized data of length thirteen values:

5,0,0,2,0,0,0,0,0,1,0,0,1

This sequence has two dimensions, namely, length, for zero value run lengths, and amplitude, for non-zero quantized data which follow a zero value run length. The two-dimensional Huffman encoded data representing this sequence are 0,5, 2,2, 5,1, 2,1

That is, the first pair of encoded data represents no zero values followed by a value of "5" while the second pair represents two zero values followed by a value of "2" the third pair represents five zero values followed by a value of "1", and so on. Thus, the sequence of thirteen quantized values is represented by eight encoded values. Assuming each encoded value is represented by four bits, the quantized data sequence of thirteen values corresponds to 32 bits of encoded data. The number of bits, 32 in this example, comprises the output from the bit length table 84.

When both the zero value run length and the amplitude are within the encodable range, the OR gate 85 outputs a control signal at low level to the Switching circuit 86 to select a terminal 86A thereof. The number of bits of encoded data from the bit length table 84 is supplied to the terminal 86A. Thus, when the number of bits in each of the zero value run length and the amplitude is within the encodable range, the number of bits of encoded data is supplied through the switching circuit 86.

When at least one of the zero value run length and the amplitude exceeds the encodable range, the OR gate 85 outputs a control signal at high level to the switching circuit 86 to select a terminal 86B thereof. A predetermined signal, such as the value "22", representing the number of bits in out-of-range encoded data, is applied to a terminal 87 and coupled to the terminal 86B. Thus, when the number of bits needed to represent the zero value run length is larger than 15, or the amplitude of the quantized transform coefficient data is larger than 16, this predetermined value representing the number of bits of the out-of-range encoded data is supplied through the switching circuit 86.

The number of bits presently output from the switching circuit 86 and a previous sum from a register 89 are supplied to an addition circuit 88, which adds these numbers and stores the result in the register 89.

The sum stored in the register 89 is supplied to an addition circuit 90. The amount of data representing all of the "end of block" codes for an encoding set, that is, $$4 \text{ bits} \cdot 6 \frac{\text{transformed blocks}}{\text{macro block}} \cdot n \frac{\text{macro blocks}}{\text{encoding set}}$$

is supplied through a terminal 91 to the addition circuit 90, which adds this "end of block" code amount to the sum from the register 89, and supplies the result to a register 92.

The count value from the counter 78 is supplied to a detecting circuit 93, which is adapted to detect whether the count value has reached the last transformed image data location in a block; that is, the 64th location or a count value "63", since the count has a value in the range 0 . . . 63.

This end of block detection from the detecting circuit 93 is supplied to a 1/6 frequency dividing circuit 94, which in turn supplies an output to a 1/n frequency dividing circuit 95. As discussed above, one macro block is comprised of six blocks of transformed image data. Thus, the output of the 1/6 frequency dividing circuit 94 indicates the end of one macro block. As also discussed above, one encoding set (or buffering unit) is comprised of n macro blocks. For example, an encoding set may have 15 macro blocks. Thus, the output of the 1/n frequency dividing circuit 95 indicates the end of an encoding set.

This indication of the end of an encoding set from the 1/n frequency dividing circuit 95 is supplied to a reset terminal of the register 89 and also to an enable terminal of the register 92.

At the end of an encoding set, the register 89 holds the number of bits representing the variable length code encoded data in that encoding set. The addition circuit 90 adds the number of bits representing all of the "end of block" codes in the encoding set to the amount held in the register 89, thereby obtaining an estimate of the total amount of data in the encoding set which is stored in register 92.

The estimate for the total amount of data in the encoding set is supplied from the register 92 to a comparing circuit 96. The target code amount is applied to a terminal 97 and coupled therefrom to the comparing circuit 96, which is adapted to determine whether the estimated amount of data representing the encoding set is less than or equal to the target code amount. The determination from the comparing circuit 96 is supplied through an output terminal 98.

The determination provided at the output terminal 98 indicates whether the amount of quantized transform coefficient data for an encoding set, corresponding to the quantizing number or set of quantizing coefficients supplied from the quantizer table 74, exceeds the target amount.

The structure of the quantizing circuit 58 and the variable length code encoding circuit 8 will now be discussed.

Figure 16:
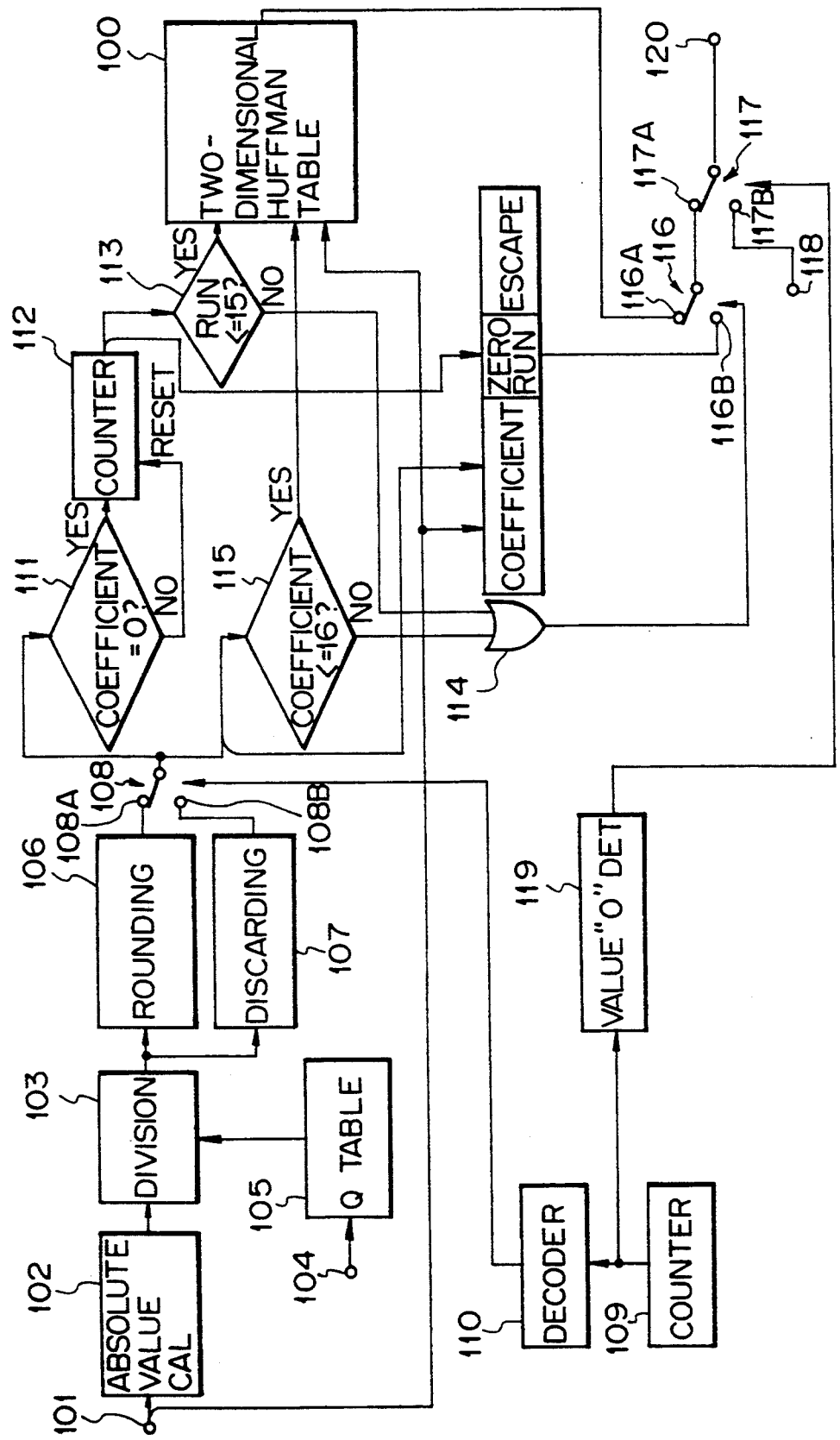
FIG. 16 is a block diagram showing an example of a quantizing circuit and variable length code encoding circuit in the embodiment of the present invention shown in FIG. 5.

FIG. 16 shows a circuit structure suitable for the quantizing circuit 58 and variable length code encoding circuit 8. Orthogonally transformed image data, that is, transform coefficients, represented by, for example, 10 bits are supplied through an input terminal 101 to an absolute value calculating circuit 102 which is adapted to remove the sign bits from each of the transformed image data and to output absolute value data of nine bits to a division circuit 103. Additionally, the sign bit of the input data is supplied to a two-dimensional Huffman table 100.

A quantizer selecting signal from a quantizing number determiner, such as the multi-stage quantizing number determining circuit shown in FIG. 5, is supplied to an input terminal 104 and coupled therefrom to a quantizer table 105 which is adapted to provide a quantizing step value in accordance with a quantizing number determined by the quantizer selecting signal, and to supply the quantizing step value to a division circuit 103 which is adapted to divide the absolute value data by the quantizing step value so as to quantize the absolute value data.

The quantized transform coefficient data from the division circuit 103 are supplied to a rounding circuit 106 and a discarding circuit 107. The rounding circuit 106 rounds the remainder received from the division circuit 103, and supplies the quantized data, after rounding, to a terminal 108A of a switching circuit 108. The discarding circuit 107 discards the remainder received from the division circuit 103, and supplies the quantized data with the remainder discarded to a terminal 108B of the switching circuit 108.

A counter 109 counts values from "0" to "63" in accordance with the addresses of a block of transformed image data, such as the addresses of the block shown in FIG. 6, and supplies these values to a decoder 110 which is adapted to select one of terminals 108A, 108B engageable by the switching circuit 108, based on the count value. In horizontal and vertical high frequency areas such as spectral area numbers #3, #5, #8, #12, #13, #14, #15 shown in FIG. 7 and each having four spectral coefficients, the remainder is discarded. In other areas, the remainder is rounded. The switching circuit 108 is switched in accordance with the address provided from decoder 110. Specifically, when the count value indicates that data for area numbers #3, #5, #8, #12, #13, #14, and #15 are being quantized, the switching circuit 108 is switched to terminal 108B. For other addresses, the switching circuit 108 is switched to terminal 108A.

The thus quantized data from the switching circuit 108 are supplied to a decision circuit 111 which is adapted to detect whether the quantized data have a value of zero. When the quantized data has a value of zero, a counter 112 increments its count by one. When the quantized data has a non-zero value, the counter 112 is reset. Thus, the counter 112 obtains the run length of quantized data having a value of zero.

Each zero value data run length from the counter 112 is supplied to a detecting circuit 113 which is adapted to determine whether the run length exceeds an encodable range by detecting whether the run length has a value less than or equal to fifteen. When the run length is fifteen or less, the run length is within an encodable range, and so a run length indication of, for example, four bits, is supplied to the two-dimensional Huffman table 100. When the run length is larger than fifteen, an appropriate signal is supplied to an OR gate 114, indicating that the run length exceeds the encodable range.

The quantized data from the switching circuit 108 are also supplied to a detecting circuit 115 which is adapted to detect whether or not the amplitude of the quantized data exceeds an encodable range by detecting whether the value of the quantized data is less than or equal to sixteen. When the amplitude is sixteen or less, the amplitude is within an encodable range, and so the quantized data, represented by four bits, are supplied to the two-dimensional Huffman table 100. When the amplitude of the quantized data is larger than sixteen, an appropriate signal is supplied to the OR gate 114, indicating that the amplitude exceeds the encodable range.

The two-dimensional Huffman table 100 is adapted to encode the data in an encoding set using a two-dimensional code as described above with regard to the bit length table 84 of FIG. 14, based on the zero value run lengths from the counter 112 and the amplitude values from the switching circuit 108, and to supply this data to a switching circuit 116.

When both the zero value run length and the amplitude are within the encodable range, the OR gate 114 outputs a control signal at low level to the switching circuit 116 to select a terminal 116A thereof. The encoded data from the Huffman table 100 are supplied to the terminal 116A. Thus, when the number of bits in each of the zero value run length and the amplitude is within the encodable range, the two-dimensionally encoded data are supplied through the switching circuit 116.

When at least one of the zero value run length and the amplitude exceeds the encodable range, the OR gate 114 outputs a control signal at high level to the switching circuit 116 to select a terminal 116B thereof. Out-of-range encoded data having a length of length 22 bits, which may include a sign bit, bits representing the amplitude of the quantized data, bits representing the zero value run length and bits forming an escape code, are supplied to the terminal 116B. Thus, when the zero value run length is larger than 15, or the amplitude of the quantized data is larger than 16, the out-of-range encoded data having a length of 22 bits are supplied through the switching circuit 116.

The encoded data from the switching circuit 116 are supplied to a terminal 117A of a switching circuit 117. Data indicating an "end of block" are supplied from, for example, a read only memory, not shown to simplify the diagram in FIG. 16, to a terminal 118 and coupled therefrom to a terminal 117B of the switching circuit 117.

The count value from the counter 109 is supplied to a detecting circuit 119 which is adapted to detect the beginning of a block of transformed image data, that is, a count value of zero from the counter 109, and to produce an output signal which causes the switching circuit 117 to switch to the terminal 117B. This results in the provision of "end of block" data at an output terminal 120. At other times, the orthogonally transformed image data, as quantized using the quantizing step from the quantizing table 105 and variable length code encoded, is provided at the output terminal 120.

Figure 17:
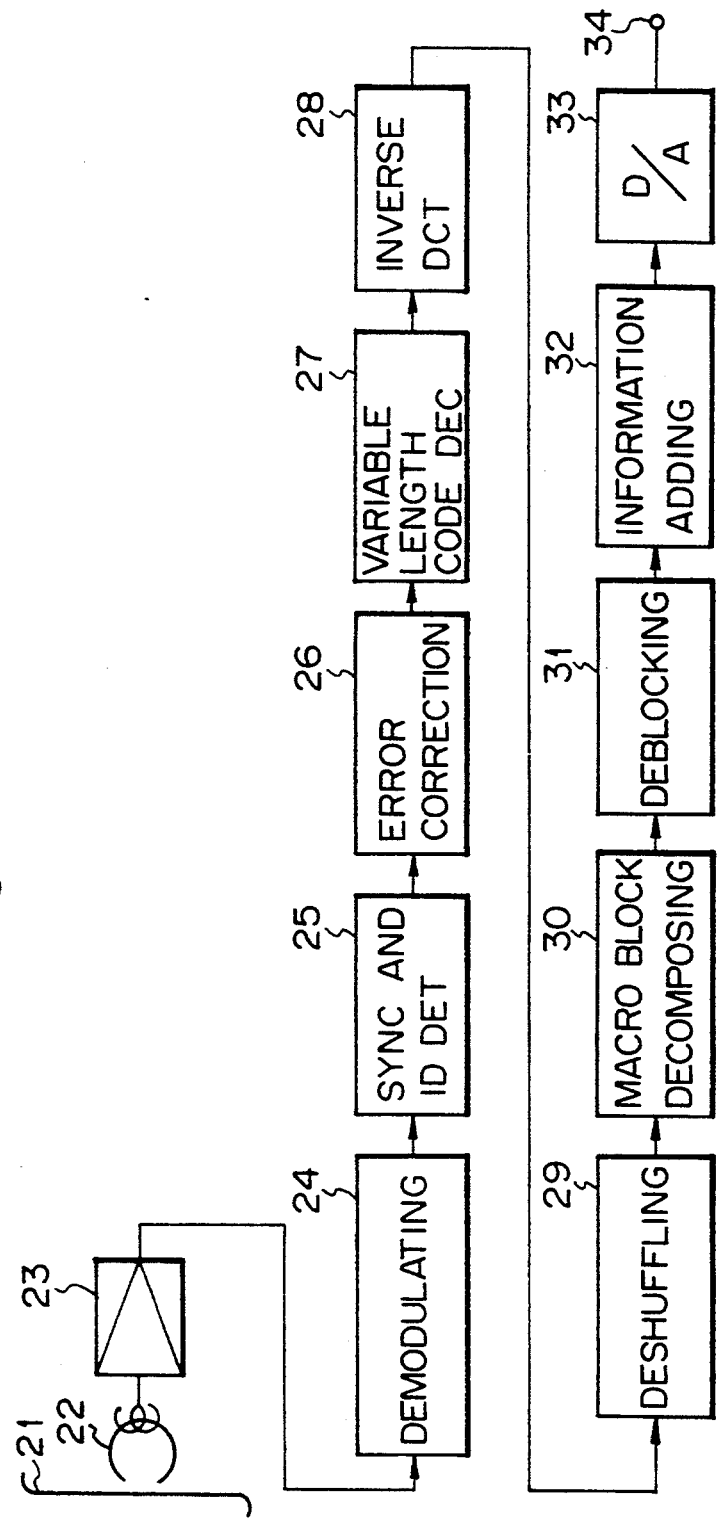
FIG. 17 is a block diagram showing the reproducing system of a digital VTR according to the present invention.

The reproducing system of a digital VTR according to the present invention will now be discussed in conjunction with FIG. 17. A record signal on a magnetic tape 21 is reproduced by a head 22 and supplied to a demodulating circuit 24 through a reproducing amplifier 23. The demodulated signal is supplied to a sync and ID signal detecting circuit 25 which is adapted to detect a sync signal and an ID signal and to provide an output signal generally corresponding to the signal produced by the encoder 9 shown in FIG. 4.

The output signal from the sync and ID signal detecting circuit 25 is supplied to an error correcting circuit 26 which is adapted to correct errors in the demodulated signal output from the detecting circuit 25 in accordance with the error correcting code that had been added by encoder 9 of FIG. 4.

The error corrected signal is supplied to a variable length code decoding circuit 27 that is adapted to decode the data in the error corrected signal in a manner complementary to variable length encoder 8 of FIG. 4, thereby recovering the orthogonally transformed image data that had been recorded.

The orthogonally transformed image data is supplied to an inverse discrete cosine transformation circuit 28, which is adapted to perform an inverse DCT transformation on this data, thereby recovering time domain image data.

The pixel data from the inverse transforming circuit 28 are supplied to a deshuffling circuit 29, which is adapted to deshuffle the super macro block and which is complementary to the shuffling circuit 6 of FIG. 4.

The deshuffled blocks are supplied to a macro block decomposing circuit 30, which is adapted to disassemble macro blocks into image data blocks which are supplied to a deblocking circuit 31 that is adapted to rearrange image data blocks into sequential image data.

The sequential image data are supplied to an information adding circuit 32 which is adapted to insert formatting information such as horizontal and vertical synchronization signals, thereby producing image data in a scanning format that are converted to an analog signal by a D/A converter 33 and output through an output terminal 34.

According to the present invention, since multiple stages of code amount estimating circuits are used in determining an optimum quantizing number, the number of code amount estimating circuits needed for implementing a quantizing number determining circuit can be decreased, thereby reducing the scale of the circuit. For example, in the conventional single-staged construction, when an optimum quantizer is selected from among 15 quantizing numbers, 15 code amount estimating circuits are required. However, according to the present invention, in a two-stage quantizing number determining circuit, only six code amount estimating circuits are necessary to determine an optimum quantizing number from among 15 quantizing numbers.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method for encoding an input image signal, comprising the steps of:

segmenting said image signal into a plurality of image blocks, orthogonally transforming said image blocks to produce corresponding blocks of spectrum data representing said image signal, selecting one of a first plurality of quantizing numbers estimated to produce a first optimal amount of encoded data for an encoding set of blocks of orthogonally transformed image data as a selected quantizing number, determining one of a second plurality of quantizing numbers having values defined as a function of the value of said selected quantizing number which is estimated to produce a second optimal amount of encoded data for said encoding set as an optimum quantizing number, quantizing each block of orthogonally transformed image data in said encoding set using said optimum quantizing number to produce respective quantized blocks, and encoding said quantized blocks using a variable length code.

2. The method of claim 1, wherein said step of orthogonally transforming comprises performing a discrete cosine transformation on said image blocks to produce said blocks of orthogonally transformed image data.

3. The method of claim 1, wherein said step of selecting includes estimating amounts of encoded data that would be respectively produced by quantizing said encoding set using each of said first plurality of quantizing numbers, and choosing from said first plurality of quantizing numbers the quantizing number expected to produced the greatest estimated amount of encoded data that is less than a predetermined threshold;

and wherein said step of determining includes estimating amounts of encoded data that would be respectively produced by quantizing said encoding set using each of said second plurality of quantizing numbers, and choosing from said second plurality of quantizing numbers the quantizing number expected to produce the greatest estimated amount of encoded data that is less than said predetermined threshold.

4. The method of claim 1, wherein the values of said first plurality of quantizing numbers are separated from each other by predetermined intervals.

5. The method of claim 1, wherein the values of said second plurality of quantizing numbers are separated from each other and from said selected quantizing number by predetermined intervals.

6. The method of claim 1, wherein each of said first and second pluralities of quantizing numbers includes a plurality of sets of quantizing numbers, with a set of quantizing numbers having larger values for quantizing transformed image data in said blocks of orthogonally transformed image data representing higher frequencies;

one set of said first plurality of quantizing numbers constituting a selected set of quantizing numbers;

one set of said second plurality of quantizing numbers constituting an optimum set of quantizing numbers; and each said block of orthogonally transformed image data in said encoding set being quantized using said optimum set of quantizing numbers.

7. The method of claim 1, wherein said step of quantizing includes dividing said transformed image data by said optimum quantizing number to produce a remainder, rounding said remainder when said transformed image data represents lower frequencies of said image signal, and discarding said remainder when said transformed image data represents higher frequencies of said image signal.

8. A method for encoding an input image signal, comprising the steps of:
- segmenting said image signal into a plurality of image blocks,
- orthogonally transforming said image blocks to produce corresponding blocks of spectrum data representing said image signal,
- selecting one of a first plurality of quantizing numbers estimated to produce a first optimal amount of encoded data for an encoding set of blocks of orthogonally transformed image data as a selected quantizing number, said first plurality comprising m quantizing numbers,
- determining one of a second plurality of quantizing numbers having values defined as a function of the value of said selected quantizing number which is estimated to produce a second optimal amount of encoded data for said encoding set as an optimum quantizing number, said second plurality comprising n quantizing numbers, said optimum quantizing number having one of $P=(m+n+m\cdot n)$ values,
- quantizing each block of orthogonally transformed image data in said encoding set using said optimum quantizing number to produce respective quantized blocks, and
- encoding said quantized blocks using a variable length code.

9. The method of claim 8, wherein $m=(1+p)^{\frac{1}{2}}-1$.

10. An apparatus for encoding an image signal, comprising:
- means for segmenting said image signal into a plurality of image blocks,
- means for orthogonally transforming said image blocks into blocks of orthogonally transformed image data,
- means for selecting one of a first plurality of quantizing numbers estimated to produce a first optimal amount of encoded data for an encoding set of blocks of orthogonally transformed image data as a selected quantizing number,
- means for determining one of a second plurality of quantizing numbers having values defined as a function of the value of said selected quantizing number which is estimated to produce a second optimal amount of encoded data for said encoding set as an optimum quantizing number,
- means for quantizing each block of orthogonally transformed image data in said encoding set using said optimum quantizing number to produce respective quantized blocks, and
- means for encoding said quantized blocks using a variable length code.

11. The apparatus of claim 10, wherein said means for orthogonally transforming includes means for performing a discrete cosine transformation on said image blocks to produce said blocks of orthogonally transformed image data.

12. The apparatus of claim 10, wherein said means for selecting includes means for estimating amounts of encoded data respectively produced by quantizing said encoding set using each of said first plurality of quantizing numbers, and means for choosing from said first plurality of quantizing numbers the quantizing number expected to produce the greatest estimated amount of encoded data that is less than a predetermined threshold;

and wherein said means for determining includes means for estimating amounts of encoded data respectively produced by quantizing said encoding set using each of said second plurality of quantizing numbers, and means for choosing from said second plurality of quantizing numbers the quantizing number expected to produce the greatest estimated amount of encoded data that is less than said predetermined threshold.

13. The apparatus of claim 10, wherein the values of said first plurality of quantizing numbers are separated from each other by predetermined intervals.

14. The apparatus of claim 10, wherein the values of said second plurality of quantizing numbers are separated from each other and from said selected quantizing number by predetermined intervals.

15. The apparatus of claim 10, wherein
- each of said first and second pluralities of quantizing numbers includes a plurality of sets of quantizing numbers, with a set of quantizing numbers having larger values for quantizing transformed image data in said blocks of orthogonally transformed image data representing higher frequencies;
- one set of said first plurality of quantizing numbers constitutes a selected set of quantizing numbers;
- one set of said second plurality of quantizing numbers constitutes an optimum set of quantizing numbers; and
- each said block of orthogonally transformed image data in said encoding set is quantized using said optimum set of quantizing numbers.

16. The apparatus of claim 10, wherein said means for quantizing includes means for dividing said transformed image data by said optimum quantizing number to produce a remainder, means for rounding said remainder when said transformed image data represents lower frequencies of said image signal, and means for discarding said remainder when said transformed image data represents higher frequencies of said image signal.

17. An apparatus for encoding an image signal, comprising:
- means for segmenting said image signal into a plurality of image blocks,
- means for orthogonally transforming said image blocks into blocks of orthogonally transformed image data,
- means for selecting one of a first plurality of quantizing numbers estimated to produce a first optimal amount of encoded data for an encoding set of blocks of orthogonally transformed image data as a selected quantizing number, said first plurality comprising m quantizing numbers,
- means for determining one of a second plurality of quantizing numbers having values defined as a function of the value of said selected quantizing number which is estimated to produce a second optimal amount of encoded data for said encoding set as an optimum quantizing number, said second plurality comprising n quantizing numbers, said optimum quantizing number having one of $P=(m+n+m \cdot n)$ values, means for quantizing each block of orthogonally transformed image data in said encoding set using said optimum quantizing number to produce respective quantized blocks, and means for encoding said quantized blocks using a variable length code.

18. The apparatus of claim 17, wherein $m=(1+P)^{\frac{1}{2}}-1$.

19. A method for determining an optimum quantizing number for an encoding set having a predetermined number of blocks of orthogonally transformed image data, said method comprising the steps of:

choosing a first series of quantizing numbers from among a range of quantizing numbers, estimating respective amounts of encoded data resulting from quantizing said blocks in said encoding set with each of the quantizing numbers in said first series and encoding the quantized blocks using a variable length code, selecting the quantizing number of said first series corresponding to the greatest estimated amount of encoded data less than a target threshold as a selected quantizing number, choosing a second series of quantizing numbers from among said range of quantizing numbers as a function of said selected quantizing number, estimating respective amounts of encoded data resulting from quantizing said blocks in said encoding set with each of the quantizing numbers in said second series and encoding the quantized blocks using a variable length code, and determining the quantizing number of said second series corresponding to the greatest estimated amount of encoded data less than said target threshold as said optimum quantizing number.

20. A method for determining an optimum quantizing number for an encoding set having a predetermined number of blocks of orthogonally transformed image data, said method comprising the steps of:

choosing a first series of quantizing numbers from among a range of quantizing numbers, said first series having m values separated by predetermined intervals approximately of value i, estimating respective amounts of encoded data resulting from quantizing said blocks in said encoding set with each of the quantizing numbers in said first series and encoding the quantized blocks using a variable length code, selecting the quantizing number of said first series corresponding to the ..greatest estimated amount of encoded data less than a target threshold as a selected quantizing number, choosing a second series of quantizing numbers from among said range of quantizing numbers as a function of said selected quantizing number, said second series including said selected quantizing number and having n values separated by predetermined intervals approximately of value $j=(i-1)/n$, estimating respective amounts of encoded data resulting from quantizing said blocks in said encoding set with each of the quantizing numbers in said second .series and encoding the quantized blocks using a variable length code, and determining the quantizing number of said second series corresponding to the greatest estimated amount of encoded data less than said target threshold as said optimum quantizing number.

* * * * *